US010865815B2

(12) United States Patent
Bueter

(10) Patent No.: US 10,865,815 B2
(45) Date of Patent: Dec. 15, 2020

(54) SCREW-THREADED WORKING CYLINDER

(71) Applicants: BÜMACH ENGINEERING INTERNATIONAL B.V., Ta Emmen (NL); Josef Bueter, Haren/Altenberge (DE)

(72) Inventor: Josef Bueter, Haren/Altenberge (DE)

(73) Assignee: Buemach Engineering International B.V., TA Emmen (NL)

( * ) Notice: Subject to any disclaimer, the term of this patent is extended or adjusted under 35 U.S.C. 154(b) by 0 days.

(21) Appl. No.: 16/472,388

(22) PCT Filed: Dec. 15, 2017

(86) PCT No.: PCT/DE2017/000424
§ 371 (c)(1),
(2) Date: Jun. 21, 2019

(87) PCT Pub. No.: WO2018/113810
PCT Pub. Date: Jun. 28, 2018

(65) Prior Publication Data
US 2019/0360586 A1    Nov. 28, 2019

(30) Foreign Application Priority Data

Dec. 21, 2016    (DE) .................... 20 2016 007 691 U

(51) Int. Cl.
*F15B 15/14*    (2006.01)
*F16J 10/02*    (2006.01)
(Continued)

(52) U.S. Cl.
CPC .......... *F15B 15/1438* (2013.01); *F15B 15/14* (2013.01); *F16J 10/02* (2013.01);
(Continued)

(58) Field of Classification Search
CPC .... F15B 15/14; F15B 15/1438; F15B 15/1442
See application file for complete search history.

(56) References Cited

U.S. PATENT DOCUMENTS

| 3,881,401 A | 5/1975 | Bimba |
| 6,196,112 B1 | 3/2001 | Bueter |
| 6,276,884 B1 * | 8/2001 | Bueter .................... F15B 15/14 |
| | | 285/338 |

FOREIGN PATENT DOCUMENTS

| CN | 105090160 A | 11/2015 |
| DE | 1906301 U | 12/1964 |

(Continued)

*Primary Examiner* — Michael Leslie
(74) *Attorney, Agent, or Firm* — Laurence A. Greenberg; Werner H. Stemer; Ralph E. Locher

(57) ABSTRACT

A screw-threaded working cylinder includes a tubular cylinder that an end region. The end region has a first thread. The end region has a tapered wall section and the tapered wall section has an axial annular surface. A closure has a second thread and the closure is screwed by the second thread into the first thread in a final mounting position. The closure has a mating axial annular surface. The axial annular surface and the mating axial annular surface are pressed in a positive fitting contact to one another in the final mounting position for defining a pressure contact surface. The pressure contact surface defines a sealing plane, and a surface pressure in an area of the pressure contact surface that causes a deformation of the tubular cylinder and the closure. The deformation occurs within an elastic limit over a range from zero applied pressure to a maximum permissible pressure by a pressure medium for the working cylinder. A piston unit is accommodated in the tubular cylinder.

2 Claims, 2 Drawing Sheets

Figure 1:
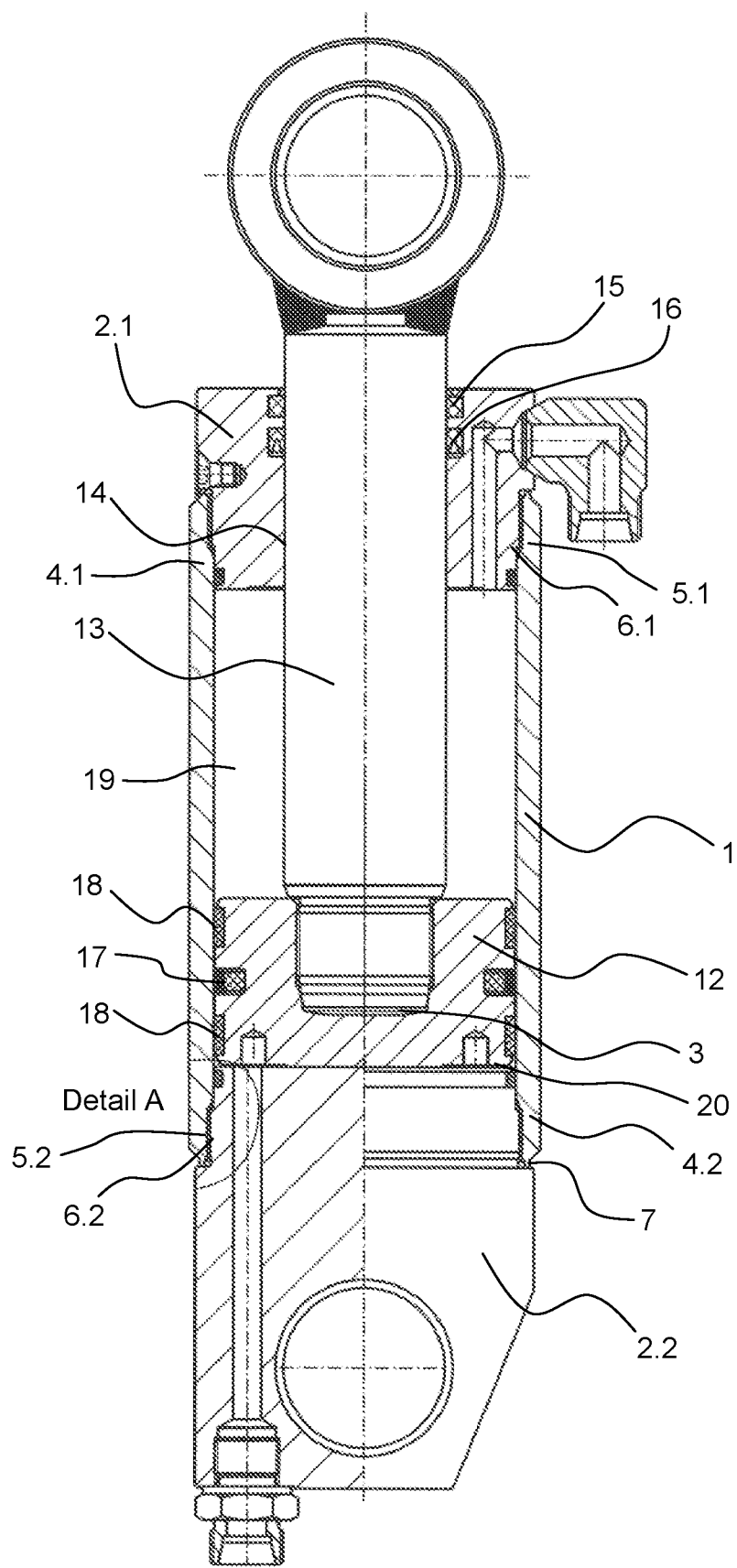

(51) Int. Cl.
*F16J 15/04* (2006.01)
*F16J 1/00* (2006.01)
(52) U.S. Cl.
CPC .......... *F16J 15/04* (2013.01); *F15B 15/1442* (2013.01); *F16J 1/008* (2013.01)

(56) References Cited

FOREIGN PATENT DOCUMENTS

| | | |
|---|---|---|
| DE | 1921843 U | 8/1965 |
| DE | 1675299 A1 | 5/1971 |
| DE | 3517137 A1 | 11/1986 |
| EP | 0880652 B1 | 8/2002 |
| EP | 1571379 A1 | 9/2005 |
| GB | 735660 A | 8/1955 |
| JP | S55140806 U | 10/1980 |
| JP | 56035861 A | 4/1981 |

* cited by examiner

SCREW-THREADED WORKING CYLINDER

BACKGROUND OF THE INVENTION

Field of the Invention

The invention relates to a working cylinder driven by a pressure medium and designed as a screw-threaded cylinder.

Screw-threaded working cylinders of various types are known from the state of the arts, especially in the form of hydraulic or pneumatic screw-threaded working cylinders. They have a tubular cylinder and at least one closure, wherein the tubular cylinder and the closure are screwed together for the assembly the screw-threaded working cylinder. At least one piston unit, usually a piston rod with a piston connected to the piston rod, is provided as a further component part of the generic screw-threaded working cylinder.

To ensure the necessary operational reliability, it is necessary, among other measures, to seal the screw-threaded working cylinder against the outside atmosphere. An approach to solve this problem is known from the publication DE 35 17 137 A1. This publication describes a working cylinder in which an elastic seal is inserted in the area of the screw connection of the tubular cylinder and the closure. When the screw connection is tightened, the seal located on the front end of the closure is additionally forced into an effective engagement with the piston rod.

Moreover, the publication DE 1 921 843 U also contains a working cylinder driven by a pressure medium, the tubular cylinder of which is screwed on both sides with closures. To ensure a pressure-tight screw connection, additional ring seals are provided in the coupling area.

The state of the art solutions for sealing a working cylinder against the outside atmosphere known from the above-mentioned publications are thus based on the inclusion of elastic sealing elements.

EP 0 880 652 describes a solution without the necessity of elastic sealing elements. In this solution, a positive pairing in the form of a cone is formed on the tubular cylinder and the closure. Production requires the highest precision in the manufacture of the sealing surfaces and their surface roughness values. The cone allows an axial sliding movement of the coupling partners in order to make the axial displacement, which results from the effect of different axial forces at different operating pressures possible.

SUMMARY OF THE INVENTION

Therefore, the object of the invention is to provide a screw-threaded working cylinder which does not require any additional sealing elements for reliable sealing against the environment and which has a high degree of operational reliability and can be manufactured in a particular easy and cost-effective manner.

The object is achieved by the features described in the independent claim. Preferred further embodiments result from the subclaims.

A screw-threaded working cylinder according to the invention has a tubular cylinder, a closure and a piston unit and is preferably available as a hydraulic or pneumatic screw-threaded working cylinder.

In the following, the tubular cylinder and the closure are also collectively referred to as coupling partners.

The tubular cylinder has an end region with a first thread and said end region is located on the side of the tubular cylinder facing the closure. The tubular cylinder is designed as a hollow cylinder and the piston unit is accommodated in the inner cavity of the tubular cylinder. Depending on the design, the piston unit comprises at least one piston and at least one piston rod, wherein the piston and piston rod can be connected to each other to form the piston unit as a one-piece component. Special designs of the piston unit can also be provided, e.g. a plunger piston if the screw-threaded working cylinder is designed as a plunger cylinder.

The closure has a second thread and is screwed with this second thread to the first thread of the tubular cylinder in a final mounting position. Preferentially, the first thread is an internal thread and the second thread is an external thread. In this design, the closure is screwed into the tubular cylinder. However, in this case a reverse design is also possible, so that the tubular cylinder is screwed into the closure.

The present invention refers to screw-threaded working cylinders with at least one screwed closure. However, the invention is not limited to screw-threaded working cylinders with only one closure. In the case of a screw-threaded working cylinder with two screwed closures, such as a differential working cylinder with a bottom closure and a guide closure, each of the two closures with the features according to the invention can be coupled to the tubular cylinder. In the case of two closures, it is also possible that one of the closures, which are located on both sides, is connected to the tubular cylinder in a different way, in particular by means of a welded joint, so that then only the respective other closure is coupled to the tubular cylinder according to the invention.

The screw-threaded working cylinder according to the invention is characterized by the fact that the end region of the tubular cylinder has a tapered wall section. The tapered wall section is a part of the end region and the tubular cylinder has a smaller wall thickness in the tapered wall section than in the remaining area.

The tapered wall section has an axial annular surface and the closure has a mating axial annular surface, which are pressed in a fractional contact with each other in the final mounting position. The fractional pressure contact is thus produced by the generation of an axial force due to the screwing of the tubular cylinder and the closure. In the area where the axial annular surface and the mating axial annular surface are positioned opposite to each other, a pressure contact surface is formed which simultaneously provides a continuous sealing plane. Along the sealing plane, the screw-threaded working cylinder is sealed against the environment.

As a result of the pressure contact between the annular surface and the mating annular surface, a surface pressure is effected at the pressure contact surface. This surface pressure in turn causes a deformation of the tubular cylinder, in particular of its tapered wall section, and of the closure. According to the invention, the deformation takes place within an elastic limit both with and without pressure application by a pressure medium. The materials of the tubular cylinder and the closure determine the elastic limit. If the tubular cylinder and the closure are made of different materials, different elastic limits must therefore be taken into account.

If high pressure is applied, considerable forces act axially on the inside of the closure. This causes a slight axial change in the position of the closure. If no pressure is applied, the slight axial change in position takes place in the opposite direction. The axial change in position has an influence on the degree of deformation of the coupling partners in the areas adjacent to the pressure contact surface. The deformation is therefore lower with high pressure than with low pressure. At the same time, the surface pressure is lower under high pressure than under low pressure.

Since the deformation is exclusively limited to the elastic range in all pressurized states according to the invention, it is completely reversible if the operating condition is changed due to the application of pressure and the absence of pressurization. Simultaneously, the invention provides for all operating conditions that the pressure contact and the effected surface pressure of the pressure contact surface ensure the formation of the sealing plane and thus a sufficient sealing of the screw-threaded working cylinder against the outside atmosphere.

Here, the term pressurization or application of pressure covers the entire value range from any minimum pressure to a maximum permissible pressure of the working medium. Even at maximum pressure, a sufficient axial force acts on the sealing pressure contact surface so that the function of the working cylinder is maintained.

The axial annular surface and the mating axial annular surface are preferably arranged in a plane that is in an essentially orthogonal position relative to the longitudinal axis.

The main advantages of the disclosed screw-threaded working cylinder compared to conventional coupling solutions are as follows:

The total axial force acting between the coupling partners is composed of the axial force acting on the closure because of the pressure applied to it by the working medium and of the axial force required to effect a sufficient surface pressure on the pressure contact surface. The total axial force must be provided via the thread of the coupling partners.

Due to the existing relationships between surface pressure, elastic limit and wall thickness of the tubular cylinder, the reduced wall thickness in the area of the tapered wall section and thus the reduced axial annular surface have the effect that lower axial forces must be applied to the pressure contact surface in order to achieve sufficient surface pressure for an elastic deformation and thus an elastic deformation. Therefore, the total axial force that acts on the thread is reduced by the invention.

Due to the lower total axial force, only a reduced thread length is required and thus smaller component dimensions of the coupling partners with considerable material savings are made possible.

Furthermore, a lower tightening torque has to be applied for screwing during the assembly of the coupling partners. This results in cost savings through smaller mounting fixtures and less energy consumption.

Moreover, it is particularly advantageous that the deformations of the tubular cylinder and the closure are, according to the invention, limited exclusively to the elastic range and are therefore completely reversible. Consequently, the screw-threaded working cylinder can be used in the long term without restricting its functionality. Since the tubular cylinder and the closure always return to their initial form, the forces occurring and the surface pressure at the pressure contact surface can always be ensured anew to the same extent.

It is also advantageous that the axial annular surface of the tapered wall section of the tubular cylinder and the mating axial annular surface of the closure do not execute any relative movement with respect to each other, even with the application of different pressures.

A further advantage is the design and technological simplicity. The tapered wall, axial annular surface and mating axial annular surface can be produced in a cost-effective machining operation. This fact offers also the advantage of simple manufacture.

Moreover, it is advantageous that additional sealing elements are not required to seal the system against the outside atmosphere, which reduces costs and simplifies the mounting process.

A further advantage is the fact that elastomer sealing elements are not required so that the use of the working cylinder at higher temperatures is also possible.

It is also advantageous that the solution according to the invention does not exclude the possibility of providing additional elastic seals, preferably in a groove of the closure, for special applications. Then, the sealing element is an additional safety measure.

According to an advantageous further embodiment, the wall thickness of the tapered wall section is maximally 60% of the wall thickness of the tubular cylinder. This design ensures that deformation only occurs within the elastic limit at all normal operating pressures and that tightness is guaranteed. Due to the low wall thickness of the tapered wall section, the axial force required for sufficient surface pressure is lower than for a surface that would result for the wall thickness of the remaining tubular cylinder. In a particularly preferred design, the wall thickness of the tapered wall section is at least 20% of the wall thickness of the tubular cylinder. Furthermore, the length of the tapered wall section is at least once the corresponding wall thickness of the tapered wall section. The resulting geometry of the tapered wall section is particularly advantageous.

In a next advantageous further embodiment, the closure has an additional sealing element, which is preferably designed as an annular elastic seal and is embedded in a groove of the closure. Here, the sealing element is an additional safety measure to ensure that the screw-threaded working cylinder is completely sealed against the outside atmosphere.

BRIEF DESCRIPTION OF THE SEVERAL
VIEWS OF THE DRAWING

Figure 2:
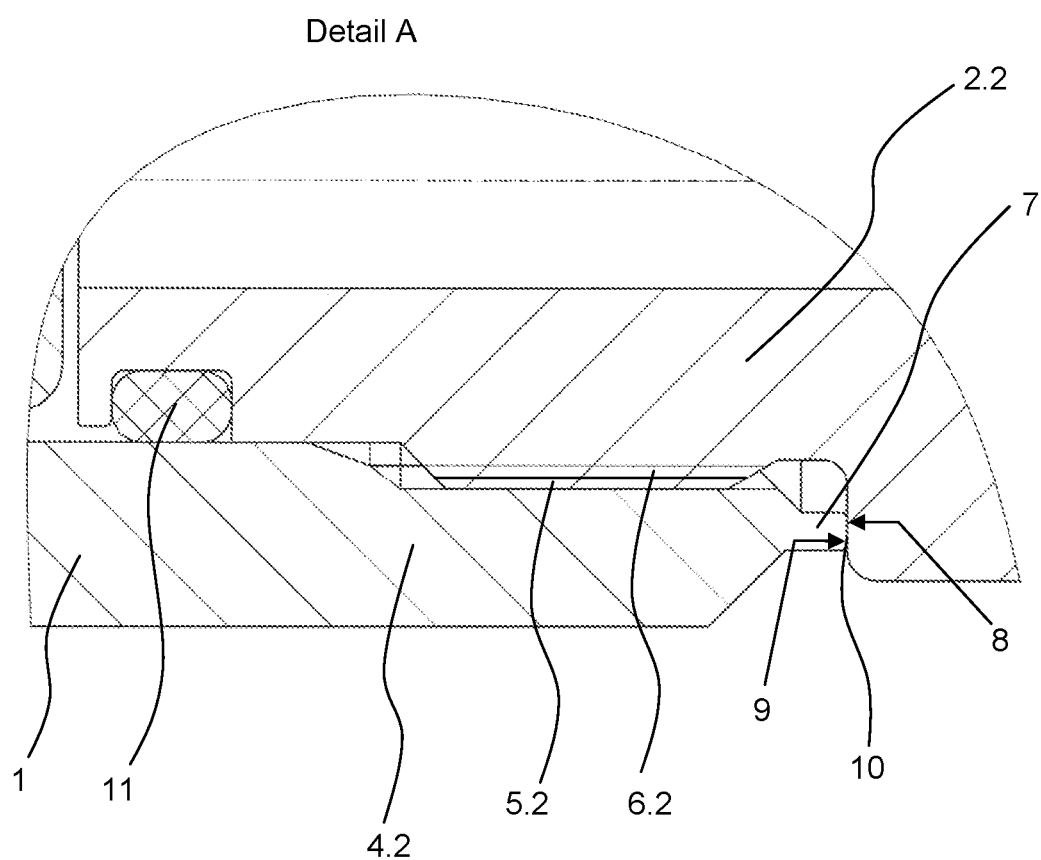

The invention is explained in more detail by the following figures:

FIG. 1 general view of the screw-threaded working cylinder in sectional representation, FIG. 2 detail view of the screw-threaded working cylinder in sectional representation.

DESCRIPTION OF THE INVENTION

FIG. 1 shows a general view of an embodiment of the screw-threaded working cylinder of the invention. In this embodiment, the tubular cylinder 1 is screwed to a guide closure 2.1 and to a bottom closure 2.2, the tubular cylinder 1 has a first thread 5.1 and 5.2 designed as an internal thread on both sides and the two closures 2.1 and 2.2 each have a second thread 6.1 and 6.2 designed as an external thread. The first threads 5.1 and 5.2 are arranged on both sides in the end regions 4.1, 4.2 of the tubular cylinder.

In addition, a piston unit 3 is accommodated in the tubular cylinder 1 which comprises a piston rod 13 and a piston 12 connected to the piston rod 13 in this embodiment. In order to allow the piston rod 13 to extend during a stroke movement, the guide closure 2.1 has a bore as an axial penetration with a closure inner wall 14.

A wiper 15 and a piston rod seal 16 are provided on the closure inner wall 14 of the guide closure 2.1. The wiper 15 is used in particular to remove dirt from the piston rod 13. The piston rod seal 16 ensures the sealing of the piston rod chamber against the outside atmosphere.

The piston 12 separates the piston rod chamber 19 and the piston chamber 20. The piston rod chamber 19 and the piston chamber 20 are also collectively referred to as working chambers. According to the embodiment of the screw-threaded working cylinder shown, a piston seal 17 is also provided. The piston seal 17 effects the sealing of the working chambers and thus an undesired passing of the pressure medium between the working chambers is prevented. Two guide belts 18 are provided on the piston 12 for its linear guidance and they simultaneously prevent the direct metallic contact with the tubular cylinder 1.

In the following, the coupling of the tubular cylinder 1 with the bottom closure 2.2 is explained in more detail. The construction described and the functional connections explained here apply in the same way to the coupling between the tubular cylinder 1 and the guide closure 2.1.

As especially FIG. 2 shows in an enlarged view of detail A of FIG. 1, the end region 4.2 of the tubular cylinder 1 has a tapered wall section 7. The tapered wall section 7 has a smaller wall thickness than the other sections of the tubular cylinder 1. In the embodiment, the wall thickness of the tapered wall section 7 is about 42% of the wall thickness of the rest of the tubular cylinder 1.

The tapered wall section 7 has an axial annular surface 8, while the bottom closure 2.2 shown here has a mating axial annular surface 9. In the final mounting position, in which the tubular cylinder 1 and the bottom closure 2.2 are screwed together, the axial annular surface 8 and the mating axial annular surface 9 are in positive pressure contact to each other. Thus, a pressure contact surface 10, which acts as a sealing plane, is generated. The sealing plane is designed such that a continuous sealing against the outside atmosphere is guaranteed along the entire pressure contact surface 10.

By tightening the screw connection, a surface pressure is produced in the area of the pressure contact surface 10 in the final mounting position, which results in an axial deformation of both the tubular cylinder 1 and the bottom closure 2.2. The load on the tubular cylinder 1, in particular on the tapered wall section 7, and on the bottom closure 2.2 combined with the surface pressure is set in such a way that in all operating conditions, i.e. with or without pressure application of the pressure medium, the deformation remains within the elastic limits of the materials used. The deformation of the coupling partners at changing operating pressures takes place exclusively in the elasticity range. As the functionality of the screw-threaded working cylinder is not restricted by irreversible plastic deformations, it can be used in the long term and is less susceptible to faults.

As FIG. 2 also shows, an additional sealing element 11 is provided in the embodiment in the bottom closure 2.2, which is designed as a ring-shaped elastic seal and is only used as an additional securing measure in special applications.

Some of the advantages achieved are mathematically demonstrated in the following by means of the embodiment, and practical values were used for the underlying parameters.

The steel grade S35 N, which has an elastic limit $R_{0.2}$, also referred to as 0.2% proof stress, of 355 N/mm², was chosen as the material for the calculation basis both for the tubular cylinder 1 and for the closures 2.1 and 2.2.

In this example, the diameter $D_K$ of the piston 12 was determined to be 75 mm. The wall thickness s of the tubular cylinder 1 is 6 mm, whereas the reduced wall thickness a in the area of the tapered wall section 7 is 2.5 mm.

The following mathematical relationships apply to the calculation of the forces acting on the annular surfaces 8; 9:

$$F_{red}=(D_K+s)*\pi*a*R_{0.2}=(75+6)*\pi*2.5*355=225{,}841 \text{ N}$$

$$F_{max}=(D_K+s)*\pi*s*R_{0.2}=(75+6)*\pi*6*355=542{,}019 \text{ N}$$

Here, $F_{red}$ indicates the force to be applied when using a reduced wall thickness of 2.5 mm and $F_{max}$ indicates the force required without using a tapered wall section 7 and thus for a wall thickness of 6 mm. The result is a reduced force $F_{red}$ of 225,841 N and a maximum force $F_{max}$ of 542,019 N.

Thus, with a constant wall thickness of 6 mm along the entire tubular cylinder 1, an approximately 2.4-fold force application would be necessary to reach the elastic region of the material to the same extent as it is the case with the use of a tapered wall section 7 with a wall thickness of 2.5 mm.

Due to the lower force $F_{red}$, which is necessary to achieve the surface pressure required for sealing when using a screw-threaded working cylinder according to the invention, a reduced thread length $l_{red}$ can be used, for example.

$$l_{red} = \frac{F_{red}*P}{d_G*\pi*H*p_{zul}} = \frac{225.841*1{,}5}{77{,}026*\pi*0{,}812*177{,}5} = 9{,}71 \text{ mm}$$

Here, P stands for the thread pitch, $d_G$ for the flank diameter of the thread, $p_{zul}$ for the permissible flank pressure for the thread and H for the thread depth are as the projected flank of the thread. The permissible flank pressure $p_{zul}$ is calculated as follows:

$$p_{zul}=R_{0.2}*0.5=355*0.5=177.5 \text{ N/mm}^2$$

According to an analogous calculation, the thread length $l_{max}$ results for the non-reduced axial annular surface 8:

$$l_{max} = \frac{F_{red}*P}{d_G*\pi*0{,}812*p_{zul}} = \frac{542.019*1{,}5}{77{,}026*\pi*0{,}812*177{,}5} = 23{,}31 \text{ mm}$$

Thus, the resulting difference between the thread lengths $l_{max}$ and $l_{red}$ is 13.6 mm. The shorter thread length achieved reduces the amount of material usage, the size and the production time of the screw-threaded working cylinder.

In addition, energy is also saved in the assembly and manufacture of the screw-threaded working cylinder. The subsequent calculation illustrates this advantage by calculating the torques $M_{red}$ for a force at the level of $F_{red}$ and $M_{max}$ for a force at the level of $F_{max}$:

$$M_{red}=F_{red}*d_G*0.5*\tan(\alpha+\rho)=225{,}841*77.026*0.5*\tan(0.36°+2.86°)$$

$$M_{red}=489{,}329 \text{ Nmm} \approx 490 \text{ Nm}$$

$$M_{max}=F_{max}*d_G*0.5*\tan(\alpha+\rho)=542{,}019*77.026*0.5*\tan(0.36°+2.86°)$$

$$M_{max}=1{,}174{,}391 \text{ Nmm} \approx 1175 \text{ Nm}$$

Here, x denotes the helix angle of the thread and ρ (Rho) the friction angle according to the formula tan(ρ)=0.05.

The difference from $M_{red}$ to $M_{max}$ denotes the savings achieved in the torque required during the assembly of the screw-threaded working cylinder. In addition, energy and time are saved correspondingly in the manufacturing process.

LIST OF REFERENCE NUMERALS 1 tubular cylinder
2.1 guide closure
2.2 bottom closure
3 piston unit
4 end region
5 first thread
6 second thread
7 tapered wall section
8 axial annular surface
9 mating axial annular surface
10 pressure contact surface
11 sealing element
12 piston
13 piston rod
14 closure inner wall
15 wiper
16 piston rod seal
17 piston seal
18 guide belt
19 piston rod chamber
20 piston chamber

The invention claimed is:

1. A screw-threaded working cylinder, comprising:
a tubular cylinder having an end region, said end region having a first thread, said end region having a tapered wall section, said tapered wall section having an axial annular surface, a wall thickness of said tapered wall section being at most 60% of a wall thickness of said tubular cylinder;
a closure having a second thread, said closure being screwed by said second thread into said first thread in a final mounting position, said closure having a mating axial annular surface;
said axial annular surface and said mating axial annular surface being pressed in a positive fitting contact to one another in the final mounting position for defining a pressure contact surface, said pressure contact surface defining a sealing plane, and a surface pressure in an area of said pressure contact surface causing a deformation of said tubular cylinder and said closure, the deformation occurring within an elastic limit over a range from zero applied pressure to a maximum permissible pressure by a pressure medium for the working cylinder; and
a piston unit being accommodated in said tubular cylinder.

2. The screw-threaded working cylinder according to claim 1, wherein said closure is provided with a sealing element.

* * * * *